US012767367B2

(12) United States Patent
Nitsch

(10) Patent No.: US 12,767,367 B2
(45) Date of Patent: Oct. 20, 2026

(54) HANDLING APPARATUS AND METHOD FOR TRANSPORTING AND HANDLING CONTAINERS

(71) Applicant: KHS GmbH, Dortmund (DE)

(72) Inventor: Thomas Nitsch, Kleve (DE)

(73) Assignee: KHS GmbH, Dortmund (DE)

(*) Notice: Subject to any disclaimer, the term of this patent is extended or adjusted under 35 U.S.C. 154(b) by 206 days.

(21) Appl. No.: 18/714,350

(22) PCT Filed: Jan. 11, 2023

(86) PCT No.: PCT/EP2023/050519
§ 371 (c)(1),
(2) Date: May 29, 2024

(87) PCT Pub. No.: WO2023/135157
PCT Pub. Date: Jul. 20, 2023

(65) Prior Publication Data

US 2025/0026520 A1 Jan. 23, 2025

(30) Foreign Application Priority Data

Jan. 17, 2022 (DE) ......................... 102022100896.7

(51) Int. Cl.
*B65B 35/46* (2006.01)
*B65C 9/04* (2006.01)

(52) U.S. Cl.
CPC ................ *B65B 35/46* (2013.01); *B65C 9/04* (2013.01)

(58) Field of Classification Search
CPC ...... B65G 29/00; B65G 47/244; B65G 47/80; B65B 35/46; B65B 9/04
See application file for complete search history.

(56) References Cited

U.S. PATENT DOCUMENTS 3,018,006 A * 1/1962 Zilahy .................... B65G 29/00 414/744.2
3,934,714 A * 1/1976 Matsumoto .......... B65G 47/244 198/379

(Continued)

FOREIGN PATENT DOCUMENTS

DE 7523323 U 11/1975
DE 2903470 C2 4/1989

(Continued)

OTHER PUBLICATIONS

International Search Report and Written Opinion, PCT Application No. PCT/EP2023/050519, mailed Apr. 25, 2023 (3 pages).

*Primary Examiner* — Joseph A Dillon, Jr.
(74) *Attorney, Agent, or Firm* — Faustino Lichauco; Leber IP Law

(57) ABSTRACT

The invention relates to a handling apparatus for containers (I), in particular for beverage containers, having a transporting carousel, which can be driven in rotation about a central axis of rotation (D), and container mounts, which are arranged on the transporting carousel and are designed to transport containers (I) along a transporting route (T), which extends over a circumferential portion of the transporting carousel, wherein the container mounts can be driven in rotation at least along part of the transporting route (T), and wherein the container mounts are each assigned a braking device (IO). According to the invention, the respective braking device (IO) is designed to brake the rotation of the container mounts variably in a braking portion (B), which extends at least along part of the transporting route (T).

16 Claims, 4 Drawing Sheets

(56) References Cited

U.S. PATENT DOCUMENTS

| | | | | | |
|---|---|---|---|---|---|
| 4,570,782 | A * | 2/1986 | Cargill | B23Q 7/1452 198/867.13 |
| 5,205,392 | A * | 4/1993 | von Seld | B23Q 7/1415 29/430 |
| 5,858,143 | A * | 1/1999 | Bright | B65C 9/40 156/218 |
| 6,308,816 | B1 * | 10/2001 | Bankuty | B67C 7/0006 198/395 |
| 6,398,006 | B1 * | 6/2002 | Dault | B65G 47/244 198/377.01 |
| 7,631,474 | B2 * | 12/2009 | Ford | B65B 21/06 53/48.8 |
| 8,955,665 | B2 * | 2/2015 | Kramer | B65C 9/04 198/377.01 |
| 9,120,588 | B2 * | 9/2015 | Deckert | B26D 7/265 |
| 9,421,760 | B2 * | 8/2016 | Till | B41J 2/04505 |
| 9,434,498 | B2 * | 9/2016 | Schmid | B65C 9/06 |
| 9,522,790 | B2 * | 12/2016 | Wilson | B65G 47/80 |
| 9,561,876 | B2 * | 2/2017 | Ehmer | B65B 17/02 |
| 9,573,711 | B2 * | 2/2017 | Nitsch | B65B 35/58 |
| 10,035,620 | B2 * | 7/2018 | Pau | B65B 35/58 |
| 10,793,367 | B1 * | 10/2020 | Wedekind | B65G 47/80 |
| 2008/0229713 | A1 * | 9/2008 | Ford | B65B 21/242 53/391 |
| 2015/0083550 | A1 * | 3/2015 | Wilson | B65G 29/00 198/377.01 |
| 2016/0229197 | A1 * | 8/2016 | Till | B41J 3/40733 |
| 2018/0362269 | A1 * | 12/2018 | Marcantoni | B65C 9/045 |
| 2024/0076089 | A1 * | 3/2024 | Mayer | B65G 47/846 |
| 2025/0026520 | A1 * | 1/2025 | Nitsch | B65C 9/04 |

FOREIGN PATENT DOCUMENTS

| | | | |
|---|---|---|---|
| DE | 102006062298 | B3 | 6/2008 |
| EP | 2277783 | B1 | 12/2012 |
| JP | H04-142239 | A | 5/1992 |

* cited by examiner

HANDLING APPARATUS AND METHOD FOR TRANSPORTING AND HANDLING CONTAINERS

RELATED APPLICATIONS

This application is a national phase under 35 USC 371 of International Application No. PCT/EP2023/050519, filed on Jan. 11, 2023, which claims the benefit of the Jan. 17, 2022 priority date of German Application No. 102022100896.7, the contents of all of which are incorporated herein by reference in their entireties.

FIELD OF INVENTION

The invention relates to a handling of beverage containers.

BACKGROUND

A known apparatus for handling containers uses container mounts that are configured as rotating plates to transport containers past an apparatus that applies adhesive. The containers are then attached to each other to form packs.

In such known handlers, it is usual to subject the container mounts to a braking force so as to calm their rotational movement. This tends to damp or compensate for imprecisions incurred by the driver.

However, having to permanently impose a braking force results in considerable wear incurred on the brake blocks provided for this purpose. In addition to this, the permanent braking causes the container mounts to run through the transporting route in an approximately consistent alignment. As a result, stray adhesive that does not make it onto the container tends to land on the same place on the container mount, thus causing a concentration of stray adhesive in one region of the container mount.

SUMMARY

An apparatus for handling containers, in particular for handling beverage containers, comprises a carousel that can be driven to rotate about a central axis of rotation, and container mounts, which are arranged on the transporting carousel and are designed to transport containers along a transporting route which extends over a circumferential portion of the transport carousel. The container mounts can be driven in rotation at least along part of the transporting route. In each case a braking device is assigned to the rotating plates.

Accordingly, both the transporting carousel as well as the container mounts themselves are configured as rotatable, such that the container mounts can be transported along the transporting route not only due to the rotation of the transporting carousel. Rather, during the transport, a rotation takes place of the container mounts about themselves, or a rotation related to the transporting carousel.

The invention relates in particular to handling apparatuses in the beverage industry. Accordingly, in this case the containers are beverage cans, in particular cans made of metal, for example, or bottles which can be formed, for example, from glass or plastic. These containers are then subjected to several handling steps. In this situation this relates, for example, to the filling, pasteurization, labelling, or also the formation of individual packs.

For this purpose, the containers are transported between individual container apparatuses, wherein, inside the handling apparatus according to the invention, not only is handling carried out, but also a further transport of the containers.

For this purpose, the handling apparatus comprises a rotating transporting carousel, wherein the containers are usually moved in rotation at a constant revolution speed.

The invention is based on the object of improving the known handling apparatuses in such a way that a longer service life can be achieved with them. In addition, stray adhesive that did not make it onto a container is spread out along the container mount rather than being concentrated in a small region thereof.

Accordingly, provision is made for the respective braking devices to be configured such as to brake the rotation of the container mounts in a variable manner, in a braking portion extending at least in sections along the transporting route. Within the framework of the invention, variable braking is understood to mean that the braking effect incurred by the braking devices on the container mounts takes effect with a differing degree of braking force along the braking portion.

The inventor has recognized in this situation that it is not necessary for the container mounts to be subjected to a constant braking effect over the entire transporting route. Rather, in particular at the end of the transporting route, a more powerful braking force is required for the transfer into the following handling apparatus or the following transport means than in the preceding sections. At the same time, the regions of the transporting carousel that lie outside the transporting route can essentially not be braked, such that the container mounts can, to a certain extent, rotate freely, as a result of which, in particular at the application of an adhesive means, the dirtying effect with the adhesive means is concentrated onto a wider region of the container mount. It does of course fall within the framework of the invention that the container mounts can also be at least minimally braked in regions outside the transporting route.

According to a preferred further embodiment of the invention, the braking portion extends over at least 10%, and preferably at least 15%, of the transporting route. In addition to this, a preferred further embodiment of the invention makes provision that the braking portion extends over a maximum of 40%, and preferably a maximum of 30%, of the transporting route. Accordingly, a variable braking or braking with variable braking force takes place only over a predefined portion of the transporting route, wherein this braking portion is preferably arranged at the rear end of the transporting route. It is of course also possible within the framework of the invention that a braking of the container mounts takes place in regions outside the braking portion. This can then, however, take place constantly and/or at a very much lower level than with braking apparatuses known from the prior art.

Preferably, the braking apparatuses are configured in such a way that the braking force generated by the braking apparatuses preferably increases along the braking portion. The braking force can then, for example, increase along the braking portion at least in sections in linear fashion and/or exponentially.

Inasmuch as a braking force is present in regions of the transporting route which are outside the braking portion, this can increase in the braking portion by at least a factor of two, preferably a factor of four, and particularly preferably by a factor of eight.

One preferred embodiment of the invention makes provision for the braking device to be capable of actuation by means of a brake control curve. Accordingly, a brake control curve is arranged along a portion of the transporting route or along the braking portion respectively, by means of which the braking effect of the braking device can be adjusted. For this purpose, the braking devices comprise in each case an actuator element guided along the brake control curve, which is configured such as to brake the container mounts by means of a braking element. This actuator element can be adjusted over the brake control curve, such as being rotated, as a result of which the braking force exerted by the braking devices is adjusted and set. For example, by the adjustment of the actuator elements, a brake block can be pressed onto a rotating drive shaft of the container mounts, wherein the degree of pressing determines the resulting brake force.

In order for the braking effect in regions outside the brake control curve to be reduced to a minimum or decreased completely, it is additionally to the purpose for a spring element to be provided, which releases the brake blocks from the drive shaft for as long as the actuator element is not actuated over the brake control curve. The brake blocks also further comprise a brake lining, in particular made of plastic.

In order to be able to generate a variable brake force along the braking portion, the brake control is configured accordingly. Preferably, the brake control curve therefore exhibits along the braking portion a distance interval which changes in relation to the central axis of rotation. According to one preferred embodiment, in each case the actuator element is in contact with the brake control curve radially and on the outside in the braking portion, wherein the brake control curve exhibits a distance interval which increases in relation to the central axis of rotation. Due to the increasing distance interval, the actuator element rotates and presses a brake block onto the drive shaft of the container mount. While such an embodiment has proved to be particularly advantageous, the invention is not restricted to such an arrangement. Accordingly, the actuator element can also be in contact with the brake control curve radially on the inside.

According to one particularly preferred embodiment of the invention, a drive device is assigned to the container mounts in each case, for rotating the container mounts. In particular, provision is made for each of the drive devices to comprise a drive actuator element, these being guided on a drive control curve arranged at least in sections along the transporting route. Accordingly, preferably not only does the braking take place, but the drive is also curve-controlled. This has the advantage that, solely due to the rotation of the transport carousel, a rotation of the container mounts can also be caused.

For this purpose, the drive actuator elements take effect in each case on a drive shaft of the container mounts, wherein the drive shafts have a drive axis of rotation which is arranged parallel to the central axis of rotation of the transporting carousel. In addition, preferably a gear unit is arranged in each case between the drive actuator elements and the assigned container mount, in particular a planetary gear, which is configured in such a way that the speed of rotation of the container mounts is increased in relation to the rotation of the drive actuator element.

In particular, a ratio of between 1:10 and 7:10 is provided for. With the aid of such a ratio it is then possible for the container mounts, and therefore also the containers, to be rotated along the transporting portion between 300° and 800°, and preferably between 340° and 740°. Particularly preferred is an embodiment in which a rotation of 720° takes place. The invention is not restricted to the incorporation of a gear unit, however. It is therefore sufficient if the drive devices are configured and arranged in such a way that the rotation of the container mounts referred to heretofore can be put into effect. An embodiment with an additional planetary gear has, however, proved to be particularly effective. At the same time, however, the gear transmission also causes an amplification of the imprecisions and instabilities, such that an effective form of braking is required, in particular at the end of the transporting route.

According to one preferred embodiment, the container mounts are further configured as rotating plates. With such a configuration, the containers are arranged on the container mounts, and are therefore supported on the container mounts only by means of the container base.

The invention preferably also makes provision that at least one applicator device is assigned to the transporting carousel, which is configured such as to apply to the containers, within the transportation route, an adhesive agent, a label, and/or a décor. This preferably takes place during the transport along the transporting route, but not within the braking portion. For example, the container is guided past the applicator device in a rotating manner, and only then is the corresponding container mount successively braked. It is then possible, for example, for a checking device to be additionally arranged along the braking portion, which checks the correct application or the correct performance of the application, but which does not itself become engaged in the handling of the containers.

The object of the invention is further a method for the transporting and handling of containers in a handling apparatus according to the invention, wherein the containers are delivered to the handling apparatus and arranged at the container mounts, and wherein the containers are moved along the transporting route by means of the transporting carousel, being driven such as to rotate on the container mounts, and wherein the rotation of the container mounts is variably braked along the braking portion.

The features referred to heretofore in the context of the handling apparatus can of course also be transferred to the method.

Preferably, the container mounts rotate during the movement along the transporting route between 300° and 800°, and for particular preference between 340° and 740°.

According to a further embodiment of the invention, within the transporting route in each case an adhesive agent, a label, and/or a décor are applied, for which purpose the containers, preferably in a rotating manner, are guided past an applicator device, and wherein a varying braking takes place only after the corresponding application has taken place.

The invention is explained in greater detail hereinafter on the basis of an exemplary embodiment. The Figures show:

DETAILED DESCRIPTION

Figure 1:
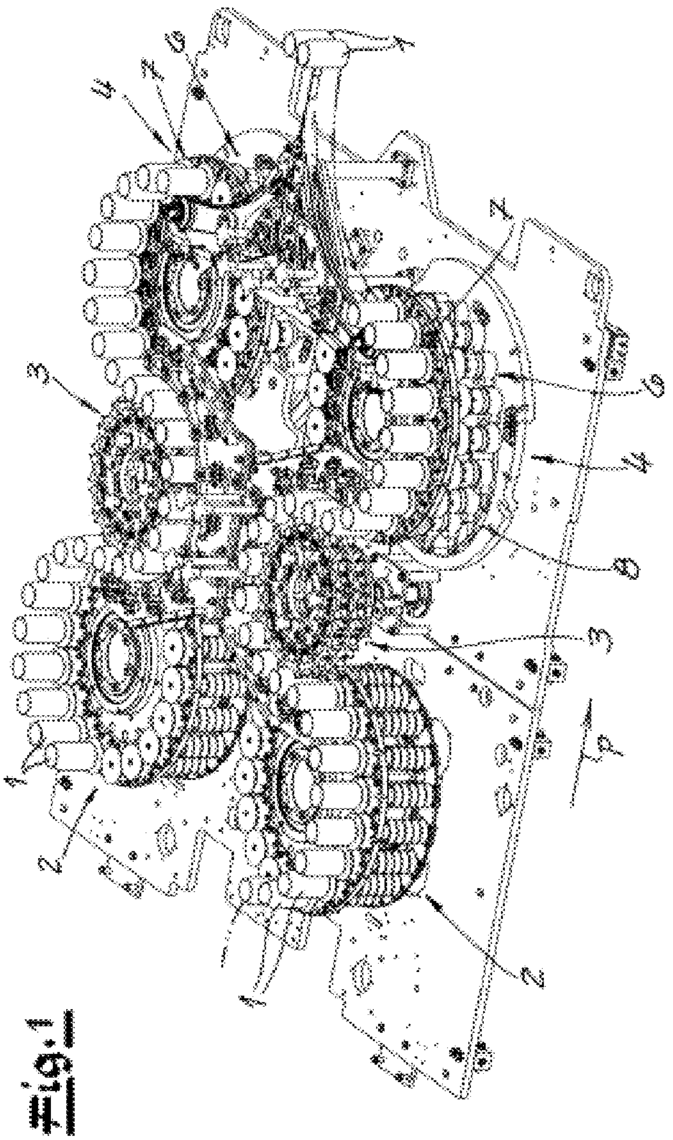
FIG. 1 shows a section from a pack-forming apparatus with a handling apparatus according to the invention.

FIG. 1 shows a section from a pack-forming apparatus that transports containers 1 in a production direction P along two tracks. In the illustrated embodiment, the containers 1 are metal cans. However, the apparatus is also usable with bottles, including bottles made of glass, plastic, and PET.

As the containers 1 traverses a track, they encounter an aligner 2 that aligns the containers in a predefined manner and a transport star 3 that transfers the containers 1 to a handler 4. As shown in FIG. 1, the tracks merge at ends thereof to assemble the containers 1 to form packs. For this purpose the aligner 2 aligns the containers 1 on a track in a predetermined manner. Then transport star 3 then transfers them to the handler 4.

Figure 2:
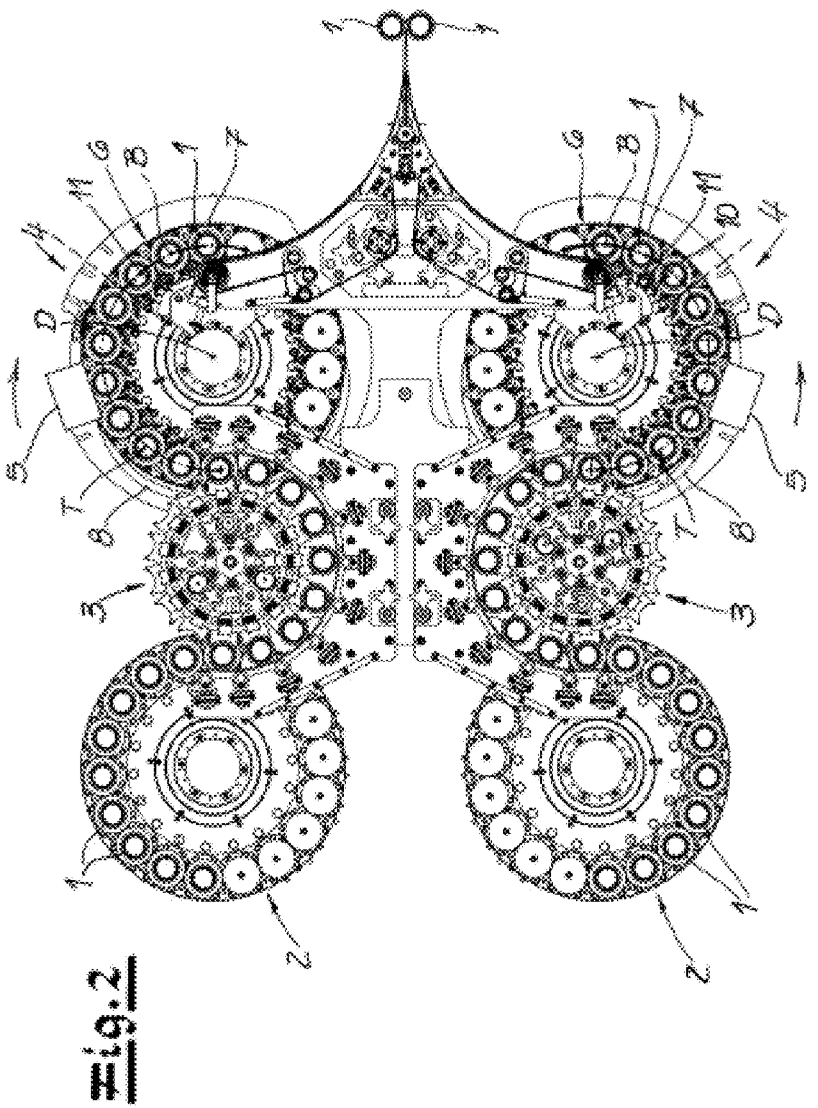
FIG. 2 shows a view from above the apparatus shown in FIG. 1.

FIG. 2 shows an applicator 5 that is not shown in FIG. 1. The applicator 5 applies an adhesive onto the containers 1 to form adhesive points that will later be used to join containers together. At the end of the handler 4, the containers from both tracks are fixed to one another using these adhesive points to form container packs.

As shown in FIGS. 1 and 2, there exist first and second handlers 4, one for each track. Each handler 4 comprises a central axis-of-rotation D about which a transporting carousel 6 is driven to rotate. Although the illustrated embodiment shows one handler 4 per track, in other embodiments, a single handler 4 handles both tracks.

Each carousel 6 comprises container mounts 7. In a preferred embodiment, each container mount 7 comprises a rotating plate. Each container mount 7 receives a container 1 at the beginning of the transport route T. Rotation of the carousel 6 transports the container 1 along the transport route T.

Figure 4:
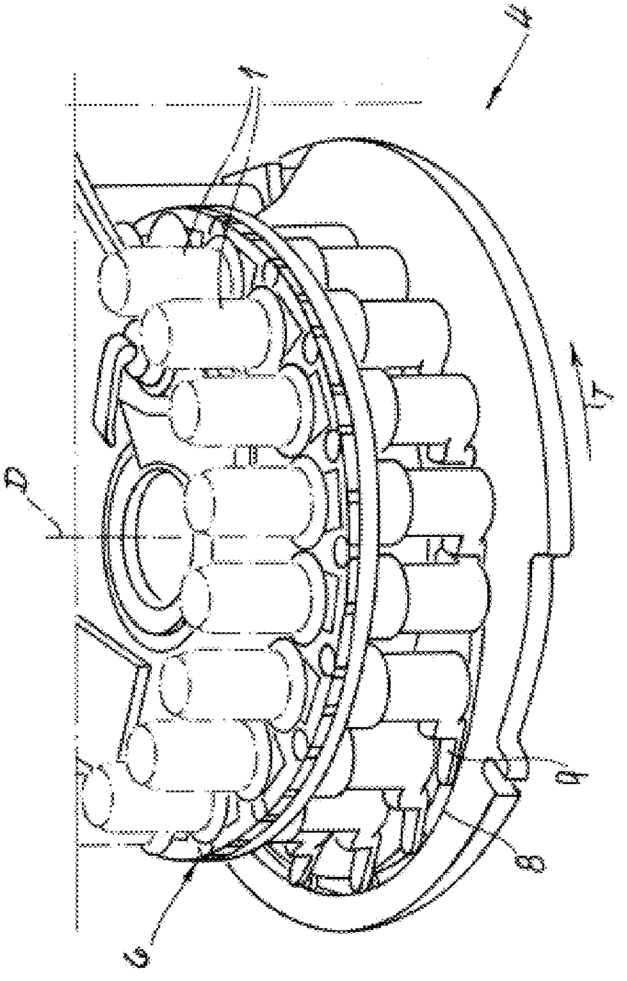
FIG. 4 is a more detailed view of the handling apparatus shown in FIG. 1.

Referring to FIG. 4, a drive-control curve 8 guides rotation of the container mount 7 as the carousel 6 transports the container 1. The radial distance between the drive-control curve 8 and the central axis-of-rotation D continually decreases along the transporting route T.

A planetary gear connects the container mounts 7 to a drive actuator 9 that is guided along the drive-control curve 8. The decreasing distance to the central axis of rotation D rotates the drive actuators 9 and therefore also the container mounts 7. The planetary gear between the mounts 7 and the actuator 9 amplifies this rotational movement in such a way that each container 1 makes two complete rotations (i.e., a 720° rotation) as it travels along the transporting route T.

As a result of the foregoing configuration, these amplified imprecisions and instabilities are transferred onto the container mounts 7. This causes the containers 1 to behave irregularly. In a worst-case scenario, the container 1 may even fail to be transferred into the correct position.

Adhesive points must be applied precisely to promote correct formation of the packs from the containers 1. As a result it is useful to stabilize the movement and rotation of the container mounts 7. This is carried out by a brake 10 that applies a braking force.

Figure 3:
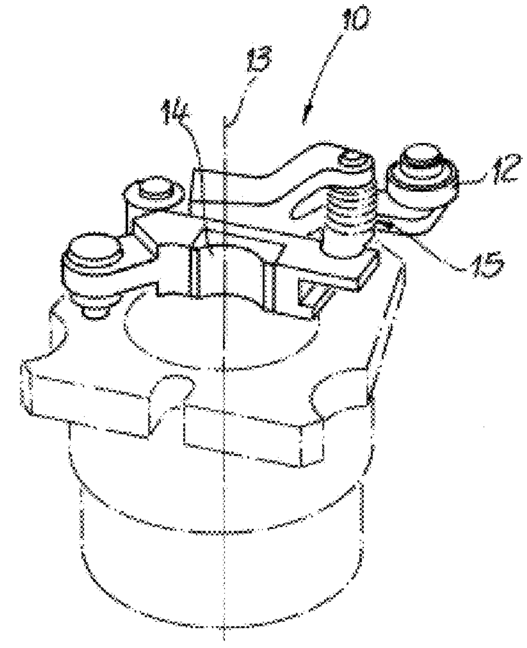
FIG. 3 shows a detailed view of a brake used in the apparatus of FIG. 1, the braking device in a detailed view.

FIG. 3 shows a suitable brake 10 that applies a variable braking force to a container mount 7 as the container mount 7 traverses a braking portion B that extends at least in sections along the transport route T. The brake 10 includes a brake actuator 12 that presses a brake lining 14 onto a drive shaft 13 of a container mount 7. A brake-control curve 11 provided in the handling apparatus 4 guides the action of the brake actuator 12.

The brake-control curve 11 is configured to cause the brake-actuator 12 to push a brake block that holds the brake lining 14 in the direction of the drive shaft 13, thereby causing application of a braking force that hinders rotation of the rotating plate that comprises the container mount 7. To achieve this, the brake-control curve 11 has a radius that increases radially outwards so as to cause the actuator 12 to apply an increasing force as the container mount 7 traverses the braking portion B. This results in an increasing braking force exerted by the brake lining 14 onto the drive shaft 13.

As can be seen in FIG. 2, the braking portion B does not extend along the entire transport route T. In a preferred embodiment, the braking portion B extends over at least 10% of the transporting route. Preferred embodiments include those in which the braking portion B extends at least 15%, and at the most 40%, and preferably at the most 30% of the transporting route T.

Referring back to FIG. 3, the brake 10 includes a spring 15 that ensures that when the container mount 7 traverses a portion of the transport route T in which the brake-control curve 11 is not present, the braking force is reduced to a minimum or eliminated completely. This reduces wear on the brake lining 14.

Having described the invention and a preferred embodiment thereof, what is claimed as new and secured by Letters Patent is:

1. An apparatus comprising a handler for containers, said handler comprising a carousel that rotates about a central axis, container mounts arranged on said carousel to transport said containers along a transport route that extends along a portion of a circumference of said carousel, said container mounts being rotatable while traversing said portion of said circumference, and brakes, each of which applies a variable braking force that variably brakes rotation of a corresponding one of said mounts along a braking portion of said transport route, wherein each of said brakes is configured to cause said variable braking force to increase monotonically along said braking portion.

2. The apparatus of claim 1, wherein said braking portion extends along at least ten percent of said transport route.

3. The apparatus of claim 1, wherein said braking portion extends along at least fifteen percent of said transport route.

4. The apparatus of claim 1, wherein said braking portion extends between fifteen percent of said transport route and thirty percent of said transport route.

5. The apparatus of claim 1, wherein said braking portion extends between ten percent of said transport route and forty percent of said transport route.

6. The apparatus of claim 1, wherein said handler further comprises a brake-control curve that actuates said brakes.

7. The apparatus of claim 1, wherein said handler further comprises a brake-control curve whose distance from said central axis increases along said braking portion.

8. The apparatus of claim 1, wherein said handler further comprises an actuator guided along a brake-control curve whose distance from said central axis increases along said braking portion.

9. The apparatus of claim 1, wherein said handler further comprises drives, each of which is assigned to a container mount to cause rotation of said container mount.

10. The apparatus of claim 1, wherein said handler comprises a drive actuator that is guided along a drive-control curve that is arranged along a section of said transport route.

11. The apparatus of claim 1, wherein said handler is configured to rotate said container mounts along said transport route by between 340° and 740°.

12. The apparatus of claim 1, wherein each of said container mounts comprises a rotating plate.

13. The apparatus of claim 1, wherein said handler further comprises an applicator assigned to said carousel, said applicator being configured to apply at least one of an adhesive agent and a label.

14. A method comprising delivering containers to a handler, arranging said containers on corresponding container mounts of said handler, using a carousel to move said containers along a transport route through said handler, while using said carousel to move said containers along said transport route, rotating said container mounts, and applying a variable braking force to each of said container mounts while said container mount traverses a braking portion of said transport route, said variable braking force being a force that increases monotonically along said braking portion of said transport route.

15. The method of claim 14, wherein rotating said container mounts comprises causing each of said container mounts to rotate along said transport route by between three hundred degrees of arc and eight hundred degrees of arc.

16. The method of claim 14, further comprising applying at least one of an adhesive and a décor to said container while said container traverses said transport route through said handler.

* * * * *